United States Patent

Connors et al.

[11] Patent Number: 5,434,704
[45] Date of Patent: Jul. 18, 1995

[54] NIGHT VISION WEAPON SIGHT

[75] Inventors: Clifford J. Connors, Tempe; Gary A. Wannagot, Mesa; Roland M. Morley, Tempe, all of Ariz.

[73] Assignee: Litton Systems, Inc., Beverly Hills, Calif.

[21] Appl. No.: 930,745

[22] Filed: Aug. 14, 1992

[51] Int. Cl.$^6$ .................... G02B 23/08; G02B 23/12; F41G 1/32
[52] U.S. Cl. .................. 359/403; 359/424; 359/425; 359/554; 359/894; 33/241; 33/248; 250/333; 356/252
[58] Field of Search ............... 359/402, 403, 405, 423, 359/424, 425, 426, 427, 428, 429, 433, 434, 418, 822, 823, 894, 600, 896, 554, 555; 356/248, 251, 252, 255; 250/330, 333; 33/241, 246, 261, 247, 252, 253, 248

[56] References Cited

U.S. PATENT DOCUMENTS

| D. 274,915 | 7/1984 | Keil et al. | D16/133 |
|---|---|---|---|
| 3,078,731 | 2/1963 | Cator | 359/896 |
| 3,582,178 | 6/1971 | Boughton et al. | 356/252 |
| 3,784,305 | 1/1974 | Hartmann | 359/433 |
| 4,124,798 | 11/1978 | Thompson | 359/400 |
| 4,266,129 | 5/1981 | Versteeg et al. | 250/330 |
| 4,266,873 | 5/1981 | Hacskaylo et al. | 33/241 |
| 4,373,269 | 2/1983 | Doliber et al. | 33/246 |
| 4,417,814 | 11/1983 | Doliber | 356/252 |
| 4,463,252 | 7/1984 | Brennan et al. | 250/214 VT |
| 4,582,400 | 4/1986 | Lough | 359/402 |
| 4,629,295 | 12/1986 | Vogl | 359/400 |
| 5,084,780 | 1/1992 | Phillips | 359/350 |
| 5,144,479 | 9/1992 | Aharon et al. | 359/424 |

Primary Examiner—Loha Ben
Assistant Examiner—John Juba, Jr.
Attorney, Agent, or Firm—Poms, Smith, Lande & Rose

[57] ABSTRACT

A night vision sight is provided for use with a weapon, which includes an objective lens and a non-inverting image intensifier tube disposed along an optical axis, providing an intensified target image. The sight is focused by direct movement of the image intensifier tube relative to the fixed position of the objective lens. A reticle projector is disposed orthogonal to the optical axis and provides a collimated reticle image, the reticle image providing an aiming point for the weapon. The reticle image is superimposed over the target image, which are reflected into an eyepiece of the sight. The eyepiece has an axis between the optical axis and a sight line passing through a pre-existing sight provided with the weapon. Adjustment of the apparent position of the reticle to compensate for azimuth and elevation is accomplished by moving the reticle projector about crossed cylindrical bearings.

29 Claims, 6 Drawing Sheets

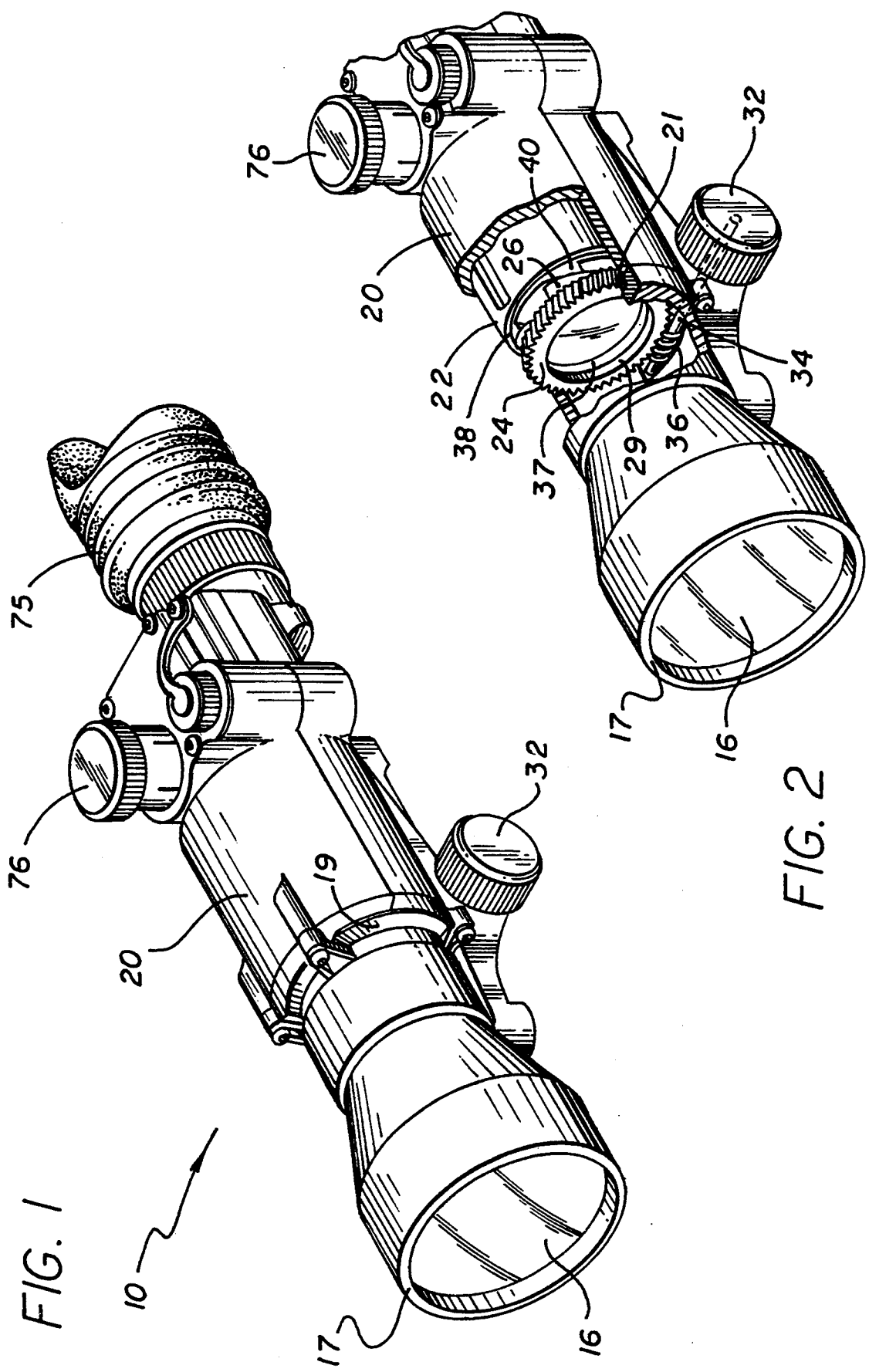

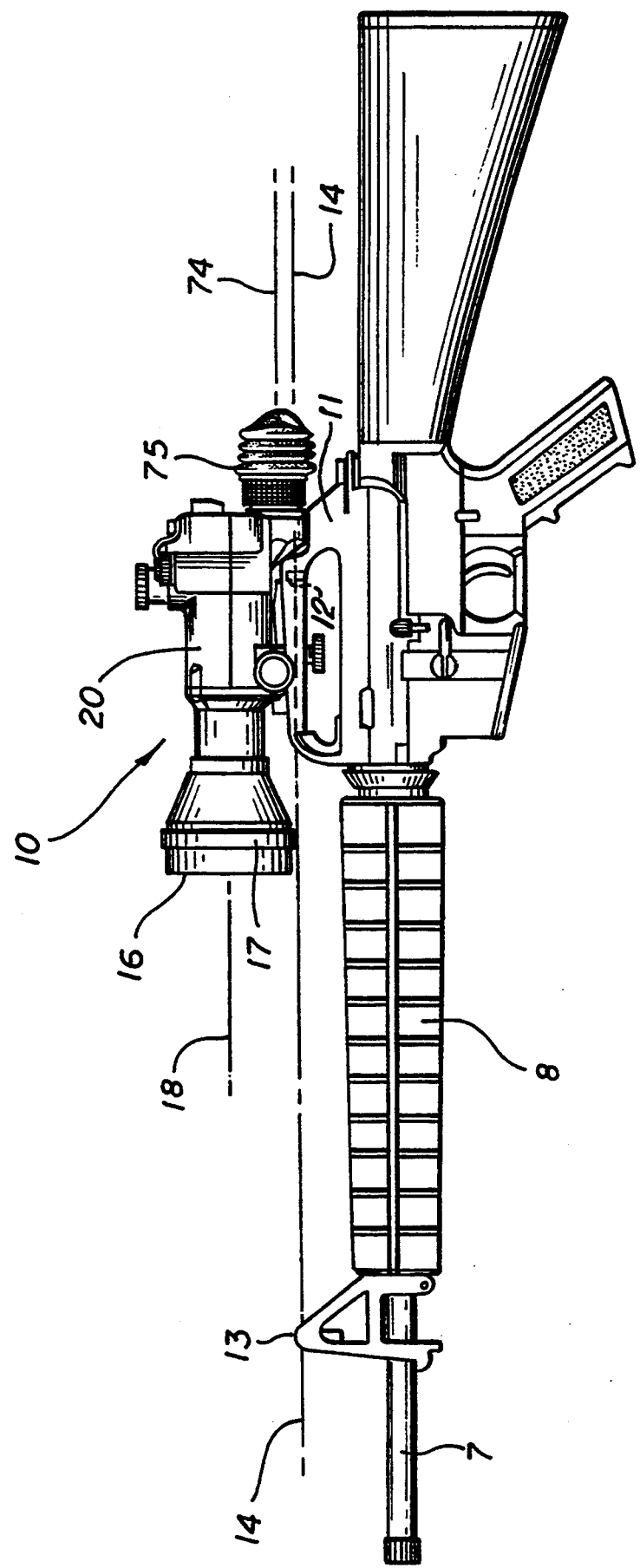

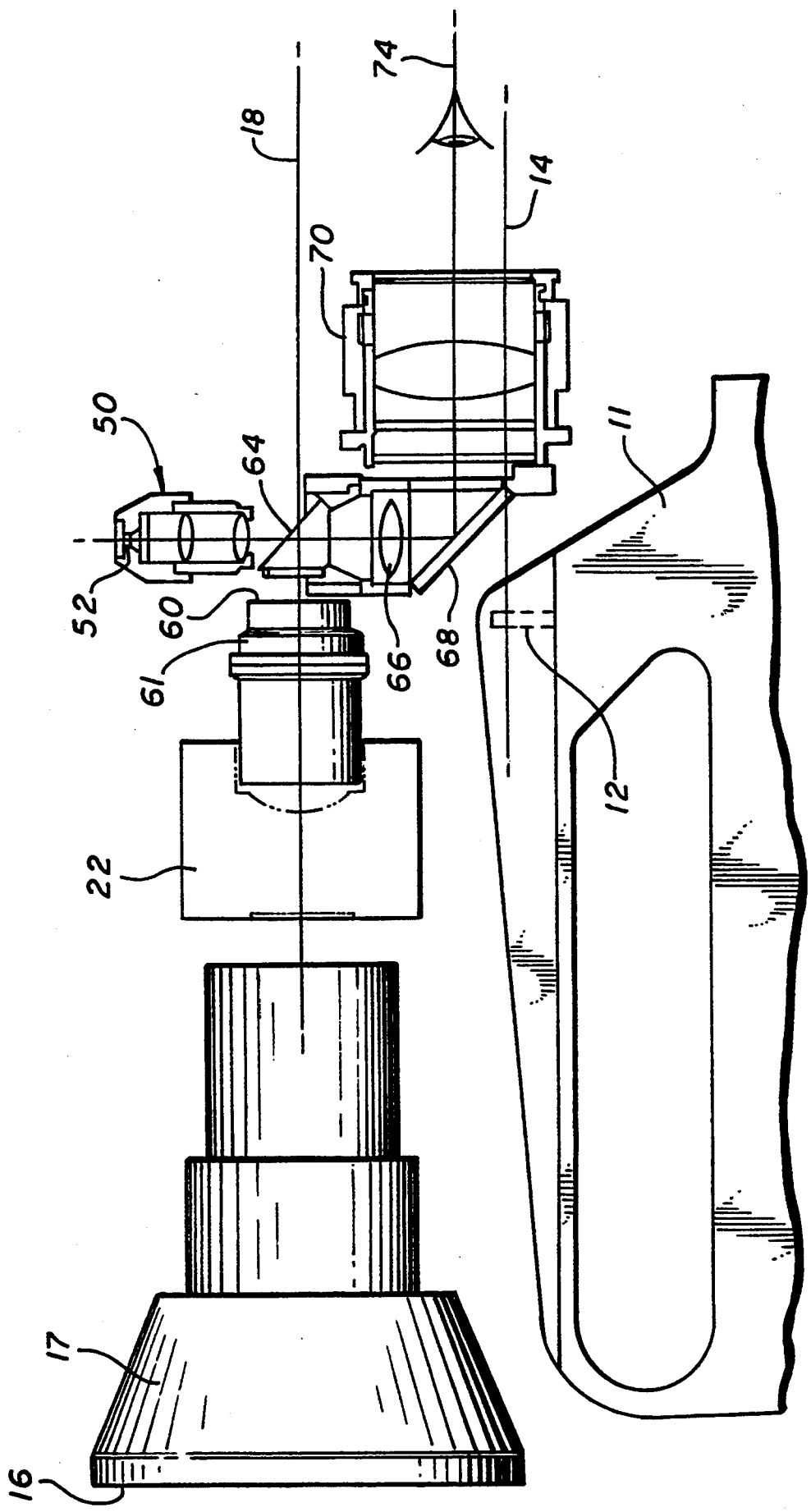

NIGHT VISION WEAPON SIGHT

BACKGROUND OF THE INVENTION

1. Field of the Invention

The present invention relates to night vision systems, and more particularly, to an improved night vision weapon sight.

2. Description of Related Art

Military and law enforcement personnel which use weapons, such as rifles, have long sought ways to improve their aim. By improving their shooting accuracy, these personnel increase their own effectiveness and survivability, while minimizing the possibility of innocent bystanders being inadvertently shot. The typical rifle is provided with a mechanical sight which is aligned to the barrel of the rifle. The operator visually aligns the mechanical sight with the desired target by peering down the barrel.

Since the desired target cannot be observed accurately at night, night vision systems are commonly used as night vision weapon sights. These systems employ an image intensification process which amplifies the ambient light reflected or emitted by an observed object. The image intensification process involves conversion of the received ambient light into electron patterns and projection of the electron patterns onto a phosphor screen for conversion of the electron patterns into light visible to the observer. This visible light is then viewed by the operator through a lens provided in an eyepiece of the night vision system. The night vision weapon sight is often equipped with a high power magnification, such as three times magnification (3X).

Instead of using the mechanical sight, internal sighting systems can be incorporated into the night vision sight. These sighting systems utilize a light source which is superimposed over the viewed image to provide an aim point, or reticle. The light source is aligned, or boresighted, to the barrel of the weapon, so that it designates the point which would be struck by a bullet fired from the weapon. The operator uses the night vision sight by overlaying the reticle over the image of the desired target viewed through the sight. Night vision sights having internal aiming reticles can enable an operator to accurately strike a distant target during low light conditions.

In typical night vision systems, an objective lens forms an inverted image on an internal image intensifier tube, which performs the image intensification process. In order for the system to present the user with an upright image, the image intensifier tube inverts the image. An inverting intensifier tube contains a fused fiber optic slug with a 180 degree twist. The eyepiece is non-inverting, and provides magnification of the image as desired by the user. Range focusing of the night vision weapon sight is accomplished by changing the relative distance between the objective lens and the image intensifier tube.

Non-inverting image intensifier tubes are used in other types of night vision systems, such as binoculars using a single image tube. For example, see U.S. Pat. No. 4,266,129, issued to Versteeg et al. However, non-inverting tubes have not heretofore been used in night vision sights since compatibility with traditional non-inverting eyepieces is desired. The least expensive and most uncomplicated eyepiece design is non-inverting; use of an inverting eyepiece causes the overall length of the sight to increase due to the addition of an inverting lens. Therefore, commercially available inverting image intensifier tubes were traditionally used in conjunction with non-inverting eyepieces in night vision weapon sight applications.

One problem experienced with such prior art night vision weapon sights is that of degraded aiming accuracy due to inadvertent motion of the inverting image intensifier tube. If the tube position is shifted laterally off-axis while the input image is held fixed, the output image will also shift laterally in the opposite direction. Slight lateral movement can unintentionally occur during focusing of the night vision sight, or by the mechanical shock of firing the weapon. Non-inverting tubes are insensitive to the lateral shift; if the tube position is shifted laterally while the input image is held fixed, the output image will remain fixed.

In all night vision aiming systems, it is desirable to have the aiming reticle be a contrasting color to the tube output image so that the reticle will be easy to distinguish from the scene. However, for the reticle to be a contrasting color, the reticle image must be inserted after the image intensifier tube and before the eyepiece. Therefore, any lateral movement of the tube output image will appear as a false apparent movement with respect to the reticle image. Since aiming reticles are often boresighted to a weapon with 0.1 milliradians accuracy, even slight false image movement of as little as 10 micrometers would invalidate the weapon boresight.

This problem could be alleviated by injecting the reticle image before the image intensifier tube. This way, the reticle and tube output image would move together. However, this approach diminishes the image contrast advantages described above. Moreover, the brightness of the reticle tends to "wash out" the scene images adjacent to the reticle, and can potentially even "burn" the reticle image permanently into the image intensifier tube. Thus, the disadvantages of this solution significantly outweigh the benefits.

Lateral movement of the image intensifier tube can be avoided by rigidly mounting the tube and reticle together, and move only the objective lens at the front end of the sight for focusing. Rotation of the lens causes it to move inward or outward relative to the image intensifier tube depending on the direction of rotation. Alternatively, a threaded ring could be provided which drives the lens without rotating the lens. A spring loaded rack and pinion or cam disposed on a shaft orthogonal to the optical axis could also be used. Nevertheless, these focusing methods often involve slight lateral shifts of the objective lens, which moves the scene image in the same manner as when the inverting image intensifier tube is shifted laterally. Thus, the same potential for aiming inaccuracy exists, and the problem has merely been transferred from the image intensifier tube to the objective lens.

An additional problem experienced with night vision sights which use image intensifier tube movement for range focusing is that of dioptric shift at the eyepiece. The eyepiece optics can be adjusted to accommodate the particular diopter of the operator's eye. Once the eyepiece has been properly adjusted, any movement of the focal plane of the image intensifier tube during range focusing would upset the diopter adjustment. To prevent the dioptric shift, the eyepiece can be movable in unison with the image intensifier tube. However, this renders the night vision weapon sight difficult to operate, since the operator would have to shift his eye position to accommodate each range change.

Furthermore, movement of the objective lens requires greater mechanical advantage than corresponding movement of the image intensifier tube. To allow a maximum amount of light into the sight, a large diameter objective lens is often utilized. Rotation of the lens can be cumbersome if the lens or threaded ring is large and awkward to grasp and rotate. Additionally, the lens must have sufficient internal friction so as to be intentionally difficult to rotate, and prevent unintended rotation out of adjustment due to axial shock experienced from firing the weapon. To rotate the lens, an operator must use a substantial amount of torque, requiring that a counter rotational force be applied to the instrument or to the weapon so as not to introduce cant to the alignment of the system. Besides, rotation of the lens is additionally undesirable since it could introduce unacceptable circular movement of the image viewed through the eyepiece of the sight.

A secondary problem also arises from the large size of the objective lens. The sight must be mounted on the weapon at a height sufficient to accommodate the lens size. As a result, the eyepiece of the sight would often be at a height which could be uncomfortable for the user. Weapons operators are trained to use their weapon with the mechanical sight provided with the weapon, which is typically mounted in close proximity to the top of the weapon barrel. These weapon operators practice firing their weapons with their head positioned to see the target and the mechanical sight concurrently. When the night vision sight is incorporated onto the weapon, the operators have to place their head in a different position to compensate for the higher eyepiece. Despite the inherent advantages of the night vision sight, many operators find them uncomfortable to use and less accurate because of the sight's awkward position.

This particular problem has been addressed in the prior art by U.S. Pat. No. 4,582,400, issued to Lough. The '400 patent discloses a night vision sight having an eyepiece disposed at an offset position which corresponds to the line of sight of the mechanical sight provided with the weapon. However, the Lough patent has a flaw which would render the design inoperable. In projecting the image to the eyepiece, the optical chain of the '400 patent repeatedly and unnecessarily inverts the image. The image is first inverted by the objective lens, and then inverted back to the upright configuration by the image intensifier tube. An additional lens in the eyepiece inverts the image once again, so that the final image presented to the operator remains inverted. Either the collimating lens after the image intensifier tube inverts the image as well, which adds unnecessary complexity to the scope, or the reference intends to present an inverted image to the operator. The '400 patent would be enabling if either a non-inverting eyepiece or a non-inverting image intensifier tube were used, although neither of these solutions were suggested in the reference.

Another problem experienced by users of night vision sights is that of calibrating the reticle. Ideally, the reticle should be positioned to precisely designate the target viewed through the night vision sight. However, the accuracy of the weapon can vary greatly due to external factors, such as windage and distance. A weapon operator is trained in making adjustments to the mechanical sight in azimuth and elevation to compensate for these external factors.

To adjust a reticle of a night vision sight, an operator physically moves a reticle light source along X and Y coordinates until a desired position is reached. This procedure can lead to inaccuracies since it is difficult to isolate the two measurements; often an adjustment to elevation results in inadvertent alteration to azimuth. The reticle position can also be influenced by shock or impact due to the weapon firing. As an additional problem, the reticle pattern may tend to rotate relative to the viewed image, which can disorient the operator.

Thus, it would be desirable to provide a night vision sight having an accurate and stable focusing system which does not require the operator to manipulate the objective lens. It would also be desirable to provide a night vision sight having improved aiming accuracy due to insensitivity to lateral movement of the image intensifier tube during focusing. It is additionally desired to provide a night vision sight having a simplified eyepiece which is offset to the line of sight of the mechanical sight typically provided with a weapon. It would also be desirable to provide a night vision sight which allows the reticle to be adjusted independently in azimuth and elevation.

SUMMARY OF THE INVENTION

Accordingly, a principal object of the present invention is to provide a night vision sight having a focusing mechanism in which the position of the image intensifier tube is varied rather than the objective lens.

Another object of the present invention is to provide a night vision sight using a non-inverting image intensifier tube which is insensitive to lateral movement and permits improved aiming accuracy.

Another object of the present invention is to provide a night vision sight having an offset eyepiece which is positioned equivalent to the mechanical sight provided with the weapon, and which has a simplified optical path as compared with the prior art.

Yet another object of the present invention is to provide a night weapon sight having a reticle which is adjustable independently in elevation and in azimuth.

To achieve the foregoing objects, and in accordance with the purpose of the invention, a night vision sight is provided for use with a weapon, which includes an objective lens and an image intensifier tube disposed along an optical axis, providing an intensified target image. The sight is focused by direct movement of the image intensifier tube relative to the fixed position of the objective lens. A reticle projector is disposed orthogonal to the optical axis and provides a collimated reticle image, the reticle image providing an aiming point for the weapon. The reticle image is superimposed over the target image, and the combined image reflected into an eyepiece of the sight. The eyepiece has a viewing axis between the optical axis and a sight line passing through a pre-existing sight provided with the weapon. Adjustment of the apparent position of the reticle to compensate for azimuth and elevation is accomplished by moving the reticle projector about crossed cylindrical bearings.

More specifically, a focusing assembly for a night vision system is provided in which the objective lens is fixed and the image intensifier tube is moveable along the optical axis of the objective lens. A focus knob is affixed to a threaded worm shaft which is mounted transverse to the optical axis. A ring gear is rotatable around the optical axis in mating engagement with the worm shaft. A side surface of the gear has a plurality of axially extending ramp surfaces. The image intensifier tube also has a plurality of opposing ramp surfaces in facing contact with the ramp surfaces of the ring gear. A spring biases the image intensifier tube in order to maintain contact between the ramp surfaces. The image intensifier tube changes position along the optical axis by the intentional rotation of the focus knob and the corresponding rotation of the ring gear. The ramp surfaces of the ring gear rotate about the optical axis and change their contact point with the opposing ramp surfaces, which applies an axial force to reposition the image intensifier tube. The image intensifier tube is constrained to prevent its rotation.

The night vision sight provides a non-inverting image intensifier tube disposed along an optical axis which provides an intensified target image. A reticle projector is disposed orthogonal to the optical axis and provides a collimated reticle image. The reticle image provides an aiming point for the weapon. A dichroic filter is disposed at a 45 degree angle to the optical axis. The filter reflects the intensified image and transmits the reticle image. A relay lens combines the target image and the reticle image into a single combined image. A mirror reflects the combined image into an eyepiece of the sight. The eyepiece is disposed at a position relative to the weapon equivalent to that of the pre-existing mechanical sight typically provided with the weapon.

The apparent position of the reticle image relative to the intensified image can be translated to calibrate the sight in elevation and in azimuth. An elevational cylindrical bearing permits pivotal movement of the reticle projector in a first direction, and an azimuthal cylindrical bearing permits pivotal movement of the reticle projector in a second general direction which is perpendicular to the first direction. Controlled movement of the reticle projector in either of these general directions varies the apparent position of the reticle image relative to the intensified image.

A more complete understanding of the night vision weapon sight of the present invention will be afforded to those skilled in the art, as well as a realization of additional advantages and objects thereof, by consideration of the following Detailed Description of the Preferred Embodiment. Reference will be made to the appended sheets of drawings which will be first described briefly.

BRIEF DESCRIPTION OF THE DRAWINGS

FIG. 1 shows a perspective view of an improved night vision weapon sight of the present invention;

FIG. 2 is a sectional view of the night vision weapon sight as in FIG. 1, showing the adjustment assembly for range focusing;

FIG. 3 is a side view of the night vision sight affixed to an exemplary rifle;

FIG. 7 is an exploded view of the night vision weapon sight in relation to the handle of the weapon.

DETAILED DESCRIPTION OF THE PREFERRED EMBODIMENT

Figure 4:
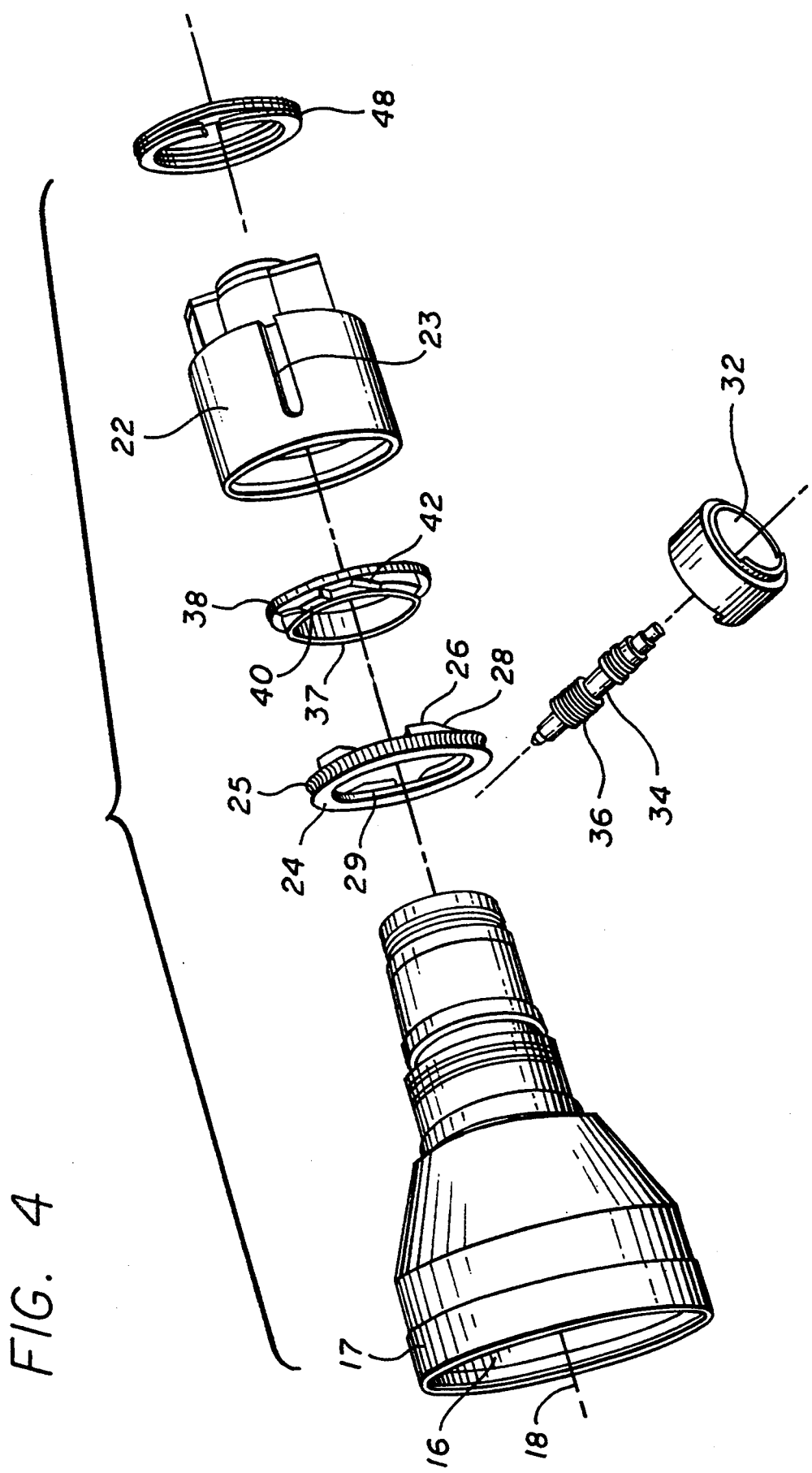
FIG. 4 is an exploded view of an adjustment assembly providing optical focusing for the night vision weapon sight.

Referring first to FIGS. 1 and 3, there is shown a night vision weapon sight 10 of the present invention. The weapon sight 10 is secured to a weapon 8 to a handle portion 11 disposed above the weapon's barrel 7. The weapon 8 shown is an M-16 rifle, however, it should be apparent that the night vision sight 10 of the present invention can be advantageously used with a wide assortment of other types of weapons. The handle portion 11 has a mechanical weapon sight comprising a rear sight 12 aligned to a front sight 13, which would typically provide the sight line 14 for the weapon in the absence of the night vision weapon sight 10. The sight line 14 through the mechanical weapon sights 12 and 13 is calibrated to intersect with the path of the bullet at the intended target. The operator of the weapon 8 typically views along the sight line 14 in order to aim the weapon at the desired target.

The night vision weapon sight 10 enables the operator to accurately sight the weapon at a desired target during conditions of darkness. The weapon sight 10 is provided within a system housing 20, as will be further described below. Ambient light emitted or reflected from a viewed scene enters an objective lens 16 at the forward portion of the system housing 20. The received light image is amplified by an image intensifier tube within the sight 10, and a reticle image overlaid upon the intensified image. This resulting image is then viewed by the operator through an offset eyepiece 70 disposed at a rear portion of the system housing 20.

Referring now to FIGS. 2 and 4, there is shown an adjustment assembly which enables focusing of the night vision weapon sight 10. The objective lens 16 has a relatively large diameter and an optical axis 18. The lens is formed within a lens housing 17, and remains in a fixed position relative to the system housing 20. Light from a scene is projected through the objective lens 16 onto an image intensifier tube 22 which forms an intensified image of the scene. As will be described below, focusing of the night vision sight is provided by axial movement of the image intensifier tube, rather than movement of the objective lens 16. By moving axially the image intensifier tube 22 relative to the fixed objective lens 16, the focal point in the plane of the image intensifier 22 corresponds to objects of varying distance.

Axial movement of the image intensifier tube 22 without rotation of the image intensifier tube is accomplished by use of a ring gear 24, a threaded worm shaft 34 and opposed ramp surfaces 28 and 42. The ring gear 24 is rotatable around the optical axis 18 and has protruding teeth 25 surrounding the outer surface of the gear. The teeth mechanically engage a threaded portion 36 of a worm gear shaft 34. An end of the shaft 34 extends outwardly from the system housing 20 and engages a knob 32. Rotation of the knob 32 causes direct rotation of the ring gear 24 by the mechanical engagement between the worm gear 34 and the ring gear.

The ring gear 24 is disposed between the objective lens 16 and the image intensifier tube 22. A side surface of the ring gear 24 which faces the image intensifier tube 22 has a plurality of ramp extensions 26. These ramp extensions 26 have ramp surfaces 28 which are diagonally disposed relative the optical axis 18. In the preferred embodiment, there are four such ramp extensions 26 evenly spaced upon the side surface of the ring gear 24, and each of the ramp surfaces 28 have a relatively shallow slope angle relative the side surface 30 of approximately 20 degrees.

In facing engagement with the ramp extensions 26, are a plurality of opposing ramp extensions 40. The opposing ramp extensions 40 are equivalent in size and displacement to the ramp extensions 26 described above, having opposing ramp surfaces 42 equivalent to the ramp surfaces 28. The opposing ramp extensions 40 are disposed so that the ramp surfaces 28 are in facing contact with the opposing ramp surfaces 42. The ramp extensions 40 extend from a forcing ring 38 disposed between the image intensifier tube and the ring gear 24. The forcing ring 38 is secured to the image intensifier tube 22, and moves the tube axially by force applied by the rotating ring gear 24.

The image intensifier tube 22 is prevented from rotation by use of a guide channel 23 disposed in an outer surface of the tube 22. The guide channel 23 is engaged by a pin (not shown) extending outwardly from an internal portion of the system housing 20. Thus, the image intensifier tube 22 can move axially along the optical axis 18 by the pin riding within the guide channel 23, but the tube cannot be rotated. To maintain positive pressure between the ramp surfaces 28 and 42, a spring 48 is disposed at an opposite end of image intensifier tube 22.

The ring gear 24 is secured in position within the system housing 20 to preclude either lateral or axial movement of the ring gear 24. The objective lens housing 17 has an adapter end 19 which can be mechanically secured to the system housing 20 by screws, bolts or other known fastening devices. An inner portion of the adapter end 19 forms a retaining wall 21 in contact with a side surface of the ring gear 24 which faces the objective lens 16. The contact between the retaining wall 21 and the ring gear 24 prevents axial movement of the ring gear.

The forcing ring 38 has an inner sleeve 37 which extends from an inside portion of the ring. The inner sleeve 37 extends into and rotates within the inside surface 29 of the ring gear 24. Since the forcing ring 38 is secured to the image intensifier tube 22, and lateral motion of the tube is precluded by its contact with the inner portion of the system housing 20, lateral motion of the ring gear is prevented.

The adjustment assembly easily enables an operator to adjust the focusing of the night vision weapon sight 10. To change the axial position of the image intensifier tube 22 along the optical axis 18, an operator rotates the knob 32. Rotation of the knob 32 causes direct rotation of the ring gear 24, which in turn causes the ramp surfaces 28 to rotate relative to the opposing ramp surfaces 42. The engagement between the ring gear 24 and the worm gear 34 provides sufficient mechanical advantage to enable easy rotation of the knob 32 and consequent movement of the image intensifier tube 22. It should be apparent that the adjustment assembly of the present invention would additionally be suitable for any sort of optical lens focusing which requires axial movement of an optical member along an optical axis without permitting rotation of the optical member about the axis.

Figure 5:
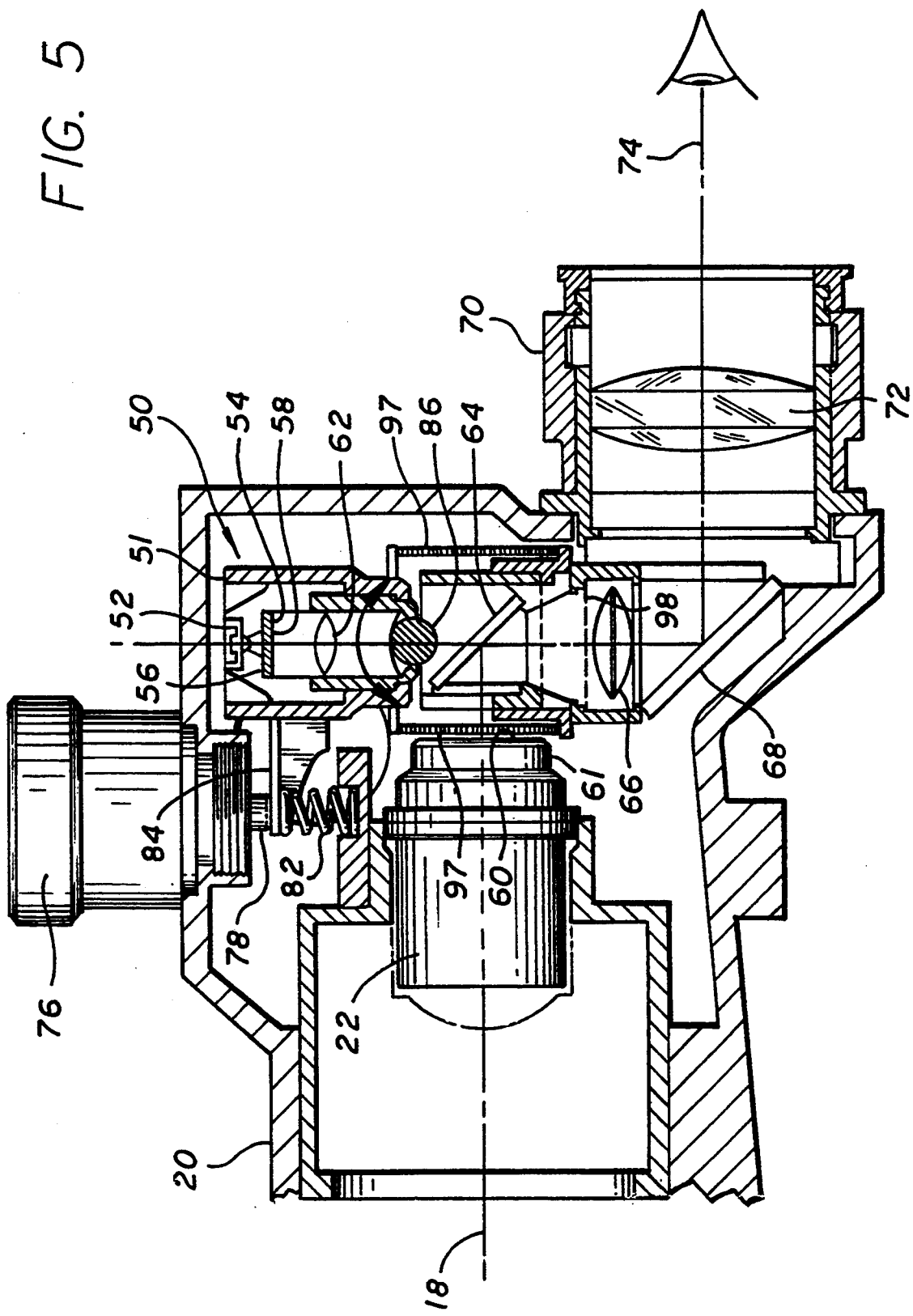
FIG. 5 is a sectional side view of the night vision weapon sight showing the offset eyepiece.

In the present invention, it is anticipated that the image intensifier tube be non-inverting. Referring to FIGS. 5 and 7, the objective lens 16 projects an inverted image of the scene onto the image intensifier tube 22. Thus, the intensified image produced by the non-inverting image intensifier tube 22 remains inverted. To return the image to the upright configuration, the image must be inverted a second time. The second inversion step occurs in the relaying optics, which will be described below.

After the image has been intensified by the image intensifier tube 22, the intensified image then must be combined with a reticle and presented to the operator. Since range focusing is accomplished by moving the image intensifier tube 24 rather than the objective lens 16, and it is desired to have contrast between the reticle image and the intensified image, the intensified image must be collimated and combined with a collimated reticle image. First, the intensified image is projected through a collimating lens 60 provided in a collimator assembly 61. The collimator assembly 61 is mounted to the image intensifier tube 22, and travels with it during focusing. By collimating the intensified image, readjustment to the diopter setting of the eyepiece 70 is unnecessary. The collimating lens 60 produces an image which appears to be projected at an infinite distance. As will be further explained below, a collimated reticle image is overlaid onto the collimated intensified image. By injecting the collimated reticle image after the image intensifier tube 22 and collimating lens 60, the reticle image maintains good contrast with the viewed scene, and avoids the problems of "wash out" and image burning described above.

Referring to FIG. 5, a reticle projector 50 produces a collimated image of a reticle which is aligned to the barrel of the weapon 8. The reticle projector 50 has a red light emitting diode (LED) 52 which provides a light source for the reticle. Red light from the LED 52 projects onto a glass plate 54. A first side 56 of the glass plate 54 is frosted or ground to provide a generally rough surface, which produces diffused light transmission through the plate 54. An opposite side 58 of the plate 54 is plated with a metallic alloy. The plated surface 58 can then be selectively etched to form a desired pattern for the reticle image. Light which passes through the plated surface 58 is collimated by a lens group 62 within the reticle projector 50. A housing 51 combines the elements of the reticle projector 50 into an enclosed cylinder. The collimated reticle image produced by the reticle projector 50 will be combined with the collimated intensified image for presentation to the operator, as will be described below.

The selective etching of the plated surface 58 can produce a wide assortment of desired reticle image patterns, such as "cross hairs", "bull's eye", or the image of objects such as tanks, vehicles, or personnel. As known in the art, the etched image selected would correspond with the type of weapon used or the particular mission which the operator performs.

It is necessary that the reticle image be manipulated so as to calibrate the reticle to the weapon 8 for windage and elevation. The entire reticle projector 50 is rotatable about two axis, in order to perform the necessary adjustment. A first cylindrical bearing 86 permits the reticle projector 50 to be pivoted in elevation. In addition, a second cylindrical bearing 98 is provided to permit the reticle projector 50 to be pivoted in azimuth. The two cylindrical bearings 86 and 98 are nested, and disposed within non-intersecting, perpendicular axes. It should be apparent to that the two cylindrical bearings 86 and 98 are sufficiently independent so that an adjustment to one would not effect the setting of the other. The bearings 86 and 98 are generally cylindrical in shape, having windows in a central portion to permit the passage of light. Load springs 97 are additionally provided, which maintain a positive pressure on the bearings 86 and 98. The springs 97 join the reticle projector housing 51 with the internal support structure of the system housing 20 adjacent to the bearing 98.

To adjust the reticle projector relative to the cylindrical bearings, adjustment mechanisms for azimuth and elevation are provided. An elevation knob 76 can be rotated by an operator to depress or raise a plunger 78. The plunger 78 acts upon an arm 84 secured to the reticle projector 50. A pressure spring 82 provides an opposing pressure against the plunger 78 to maintain the arm 84 in contact with the plunger. As the elevation knob 76 is manually rotated, the plunger 78 can be selectively extended to force the reticle projector 50 to pivot about the elevational bearing 86.

Figure 6:
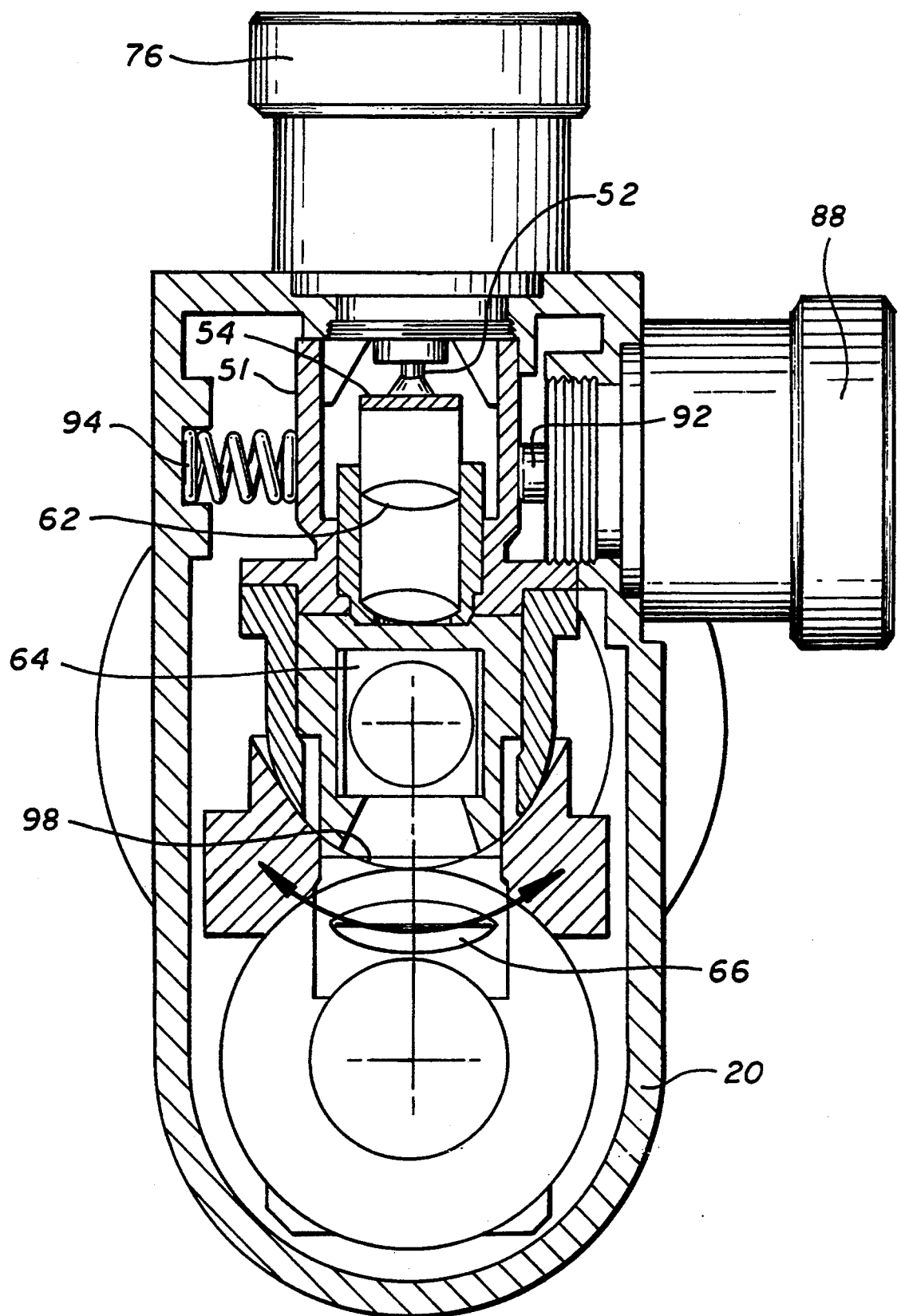
FIG. 6 is a sectional rear view of the night vision weapon sight.

Similarly, an azimuth adjustment knob 88 is provided which joins to a plunger 92, as shown in FIG. 6. The plunger 92 acts directly upon the housing 51 of the reticle projector 50, with a pressure spring 94 provided on an opposite side of the reticle projector. Rotation of the azimuth adjust knob 88 causes the plunger 92 to selectively extend so as to pivot the reticle projector 50 about the azimuth cylindrical bearing 98.

To combine the collimated intensified image with the collimated reticle image, and present the combined image to the operator, relaying optics are provided. The relaying optics include a dichroic filter 64, a relay lens 66 and a relay mirror 68. The dichroic filter 64 is disposed at a 45° angle to the optical axis 18. The relay lens 66 receives the combined images and forms an inverted intermediate image. The relay mirror 68 reflects the image produced by the relay lens 66 into the eyepiece cell 70. The relay mirror 68 is disposed at a 45° to an offset line of sight 74, and faces toward the dichroic filter 64.

As known in the art, the dichroic filter 64 is wavelength selective so as to reflect light emitted by the image intensifier tube 22, and to transmit the reticle image produced by the reticle projector 50. The dichroic filter 64 is formed of one or more dielectric layers coated onto a suitable transparent substrate. The light emitted from the image intensifier tube 22 is generally in the green range of the light spectrum, while the reticle image produced by the reticle projector 50 is in the red spectral region. The dichroic filter 64 would transmit more than 70% of the red light and reflect greater than 90% of the green light. A cutoff point for the dichroic filter 64 is selected to maximize reflectance of the light from the image intensifier tube 22, since the light from the LED can be easily increased to an acceptable level. Thus, light which reaches the relay lens 66 is a combination of the reticle image and the intensified image.

In the present invention, the offset eyepiece cell 70 is utilized to present the intensified image to the operator at the line of sight 74 which approximates that of the mechanical gun sight 12. The eyepiece cell 70 has one or more internal lenses 72 which can be used by the operator to further magnify the viewed image. As known in the art, the eyepiece cell 70 has an eyecup 75 which provides a shroud for light security surrounding the operator's eye and preventing the sight's green light glow from being seen by other forces similarly using night vision equipment. In the preferred embodiment, a commercially available eyepiece cell 70 as used in other day or night sights would be utilized. This has the advantages that the operator is already familiar with use of the eyepiece cell, and that manufacturing costs can be minimized.

Having thus described a preferred embodiment of the night vision weapon sight, it should now be apparent to those skilled in the art that the aforestated objects and advantages for the within system have been achieved. It should also be appreciated by those skilled in the art that various modifications, adaptations and alternative embodiments thereof may be made within the scope and spirit of the present invention. For example, the focusing mechanism can be advantageously used in any application requiring axial movement of a cylindrical member. The offset eyepiece could be rotated so that the eyepiece is offset laterally relative to the weapon, or perpendicular to the weapon. The night vision weapon sight can be used with a wide assortment of weapons. The present invention is further defined by the following claims:

What is claimed is:

1. A night vision sight for use with a weapon, comprising:
   an image intensifier tube disposed along an optical axis and including means for providing an intensified target image;
   a reticle projector means disposed orthogonal to said optical axis for providing a collimated reticle image providing an aiming point for said weapon;
   a dichroic filter disposed at a 45 degree angle to said optical axis, said filter reflecting said intensified image and transmitting said reticle image;
   a relay lens combining said target image and said reticle image into a combined image;
   a mirror reflecting said combined image into an eyepiece of said sight, said eyepiece having an axis between said optical axis and a sight line passing through a pre-existing sight provided with said weapon;
   a means for translating apparent position of said reticle image relative to said intensified image to calibrate said sight in elevation and azimuth;
   wherein said translating means further comprises an elevational cylindrical bearing permitting pivotal movement of said reticle projector means in a first general direction, and an azimuthal cylindrical bearing permitting pivotal movement of said reticle projector means in a second general direction, controlled movement of said reticle projector means varying the apparent position of said reticle image relative to said intensified image;
   a fixed objective lens disposed along said optical axis and means for manipulating said image intensifier tube along said optical axis to focus said night vision sight; wherein said manipulating means comprises:
   a focus knob affixed to a threaded worm shaft mounted transverse to said optical axis;
   a ring gear rotatable around said optical axis in mating engagement with said worm shaft, a side surface of said gear having a plurality of axially extending ramp surfaces;
   a plurality of opposing ramp surfaces extending axially from said image intensifier tube in facing contact with said ramp surfaces of said ring gear; and
   a spring biasing said image intensifier tube to maintain contact between said ramp surfaces, said image intensifier tube changing position along said optical axis by intentional rotation of said focus knob and corresponding rotation of said ring gear, said ramp surfaces of said ring gear rotating about said optical axis and changing contact point with said opposing ramp surfaces.

2. A night vision sight for use with a weapon, comprising:
   a non-inverting image intensifier tube disposed along an optical axis and including means for providing an intensified target image;
   a reticle projector means for providing a collimated reticle image providing an aiming point for said weapon;
   a means for superimposing said reticle image upon said target image;
   means for translating apparent position of said reticle image relative to said intensified image to calibrate said sight in elevation and in azimuth;
   wherein said translating means further comprises an elevational cylindrical bearing about which said reticle projector means pivots permitting pivotal movement of said reticle projector in a first general direction, and an azimuthal cylindrical bearing separate from said elevational cylindrical bearing and about which said reticle projector means pivots independently of pivotal movement thereof about said elevational cylindrical bearing and permitting pivotal movement of said reticle projector means in a second general direction, controlled movement of said reticle projector means varying the apparent position of said reticle image relative to said intensified image.

3. The night vision sight of claim 2, wherein said reticle projector means further comprises:
   a light source;
   a diffuser plate means for scattering light emitted from said light source and providing uniform illumination, and opposite side of said plate having a plated surface with a reticle pattern etched into said plated surface; and
   a lens element means for receiving light illuminated through said reticle pattern and both collimating said light and forming said collimated reticle image.

4. The night vision sight of claim 3, wherein said light source is a light emitting diode (LED).

5. The night vision sight of claim 2, wherein said superimposing means comprises:
   a dichroic filter disposed at a 45 degree angle to said optical axis, said filter reflecting said intensified image and transmitting said reticle image;
   a relay lens combining said target image and said collimated reticle image to form a combined image;
   a mirror reflecting said combined image into an eyepiece of said sight.

6. The night vision sight of claim 5, wherein said eyepiece has its optical axis substantially linear to the sight line of a day sight provided with said weapon.

7. The night vision sight of claim 5, wherein said eyepiece has its optical axis aligned approximately to the sight line of a day sight provided with said weapon.

8. A night vision sight having a fixed objective lens with an optical axis, comprising:
   a non-inverting image intensifier tube movable along said optical axis and including means for providing an intensified target image, and means for manipulating said image intensifier tube along said optical axis to focus said night vision system;
   means for collimating said intensified target image;
   a reticle projector means for providing a collimated reticle image, said collimated reticle image providing an aiming point for said weapon; and
   means for superimposing said collimated reticle image upon said collimated target image.

9. The night vision sight of claim 8, further comprising:
   means for translating apparent position of said reticle image relative to said intensified image to calibrate said sight in elevation and in azimuth.

10. The night vision sight of claim 8, wherein said manipulating means comprises:
    a threaded worm shaft;
    a ring gear rotatable around said optical axis in mating engagement with said worm shaft, a side surface of said gear having a plurality of axially extending ramp surfaces;
    a plurality of opposing ramp surfaces extending axially from said image intensifier tube in facing contact with said ramp surfaces of said ring gear; and
    a spring biasing said image intensifier tube to maintain contact between said ramp surfaces;
    whereby, said image intensifier tube changes position along said optical axis by intentional rotation of said worm shaft and corresponding rotation of said ring gear, said ramp surfaces of said ring gear rotating about said optical axis and changing contact point with said opposing ramp surfaces.

11. The night vision sight of claim 10, wherein said ring gear has four of said ramp surfaces.

12. A day and night weapon aiming apparatus, said apparatus comprising:
    a weapon having a line of fire;
    day sight means having a first sight line aligned with said line of fire for aiming said weapon using ambient light visible to the unaided eye of a human operator, and establishing a first position of the operator's head relative to said weapon at said first sight line;
    night sight means having a second sight line aligned with said line of fire for aiming said weapon, said night sight means including image intensifying means with an objective lens and a non-inverting image intensifier tube, said night sight means having an inverting eyepiece offset relative to said objective lens and defining said second sight line at which a visible image is presented.

13. The weapon aiming apparatus of claim 12 wherein said first and said second sight line are so disposed adjacent to one another that said second sight line establishes a second position of said operator's head relative to said weapon which is closely adjacent to said first position of said operator's head.

14. A night vision sight for use with a weapon, comprising:
    an image intensifier tube disposed along an optical axis and including means for providing an intensified target image;
    a reticle projector means disposed orthogonal to said optical axis for providing a collimated reticle image providing an aiming point for said weapon;
    a dichroic filter disposed at a 45 degree angle to said optical axis, said filter reflecting said intensified image and transmitting said reticle image;
    a relay lens combining said target image and said reticle image into a combined image;

a mirror reflecting said combined image into an eyepiece of said sight, said eyepiece having an axis between said optical axis and a sight line passing through a pre-existing sight provided with said weapon;

a means for translating apparent position of said reticle image relative to said intensified image to calibrate said sight in elevation and azimuth;

wherein said translating means further comprises an elevational cylindrical bearing about which said reticle projector means pivots permitting pivotal movement of said reticle projector means in a first general direction, and an azimuthal cylindrical bearing about which said reticle projector means pivots independently of pivotal movement thereof about said elevational cylindrical bearing permitting pivotal movement of said reticle projector means in a second general direction, controlled movement of said reticle projector means varying the apparent position of said reticle image relative to said intensified image.

15. The night vision sight of claim 14, wherein said reticle projector means further comprises:

a light source;

a diffuser plate scattering light illuminated by said light source to provide uniform illumination, an opposite side of said plate having a plated surface with a reticle pattern etched into said plated surface; and a lens element receiving light illuminated through said reticle pattern, said lens element collimating said light and forming said collimated reticle image.

16. A night vision sight for use with a weapon, comprising:

an image intensifier tube disposed along an optical axis and including means for providing an intensified target image;

a reticle projector means disposed orthogonal to said optical axis for providing a collimated reticle image providing an aiming point for said weapon;

a dichroic filter disposed at a 45 degree angle to said optical axis, said filter reflecting said intensified image and transmitting said reticle image;

a relay lens combining said target image and said reticle image into a combined image;

a mirror reflecting said combined image into an eyepiece of said sight, said eyepiece having an axis between said optical axis and a sight line passing through a pre-existing sight provided with said weapon;

further comprising a fixed objective lens disposed along said optical axis and means for manipulating said image intensifier tube along said optical axis to focus said night vision sight.

17. A night vision sight for use with a weapon, comprising:

an image intensifier tube disposed along an optical axis and including means for providing an intensified target image;

a reticle projector means for providing a collimated reticle image providing an aiming point for said weapon;

a means for superimposing said reticle image upon said target image;

means for translating apparent position of said reticle image relative to said intensified image to calibrate said sight in elevation and in azimuth;

wherein said translating means further comprises means for tilting said reticle projector means about two orthogonal axes;

wherein said means for tilting said reticle projector means about two orthogonal axes includes a first cylindrical bearing permitting tilting pivotal movement of said reticle projector means about a respective first axis, and a second cylindrical bearing disposed orthogonally to said first cylindrical bearing and permitting tilting pivotal movement of said reticle projector means about a respective second axis which is orthogonal to said first axis.

18. The night vision sight of claim 17 wherein said image intensifier tube is of the non-inverting type.

19. A night vision sight having a fixed objective lens with an optical axis, comprising an image intensifier tube movable along said optical axis, said image intensifier tube including means for providing an intensified target image; and means for manipulating said image intensifier tube along said optical axis to focus said night vision system; said manipulating means including:

a threaded worm shaft;

a ring gear rotatable around said optical axis in mating engagement with said worm shaft, a side surface of said gear having a plurality of axially extending ramp surfaces;

a plurality of opposing ramp surfaces extending axially from said image intensifier tube in facing contact with said ramp surfaces of said ring gear; and a spring biasing said image intensifier tube to maintain contact between said ramp surfaces;

whereby, said image intensifier tube changes position along said optical axis in response to rotation of said worm shaft and corresponding rotation of said ring gear, said ramp surfaces of said ring gear rotating about said optical axis and changing contact point with said opposing ramp surfaces.

20. A night vision sight for use with a weapon, comprising:

a fixed objective lens disposed along an optical axis; and an image intensifier tube moving along said optical axis to focus said night vision sight.

21. The night vision sight of claim 20 wherein said night vision sight further includes a collimator lens disposed to receive an intensified target image from said image intensifier tube, said collimator lens being fixed in positional relationship to said image intensifier tube.

22. A method of focusing a night vision device, said method comprising steps of:

providing an image intensifier tube having an optical axis;

disposing an objective lens along said optical axis; and moving said image intensifier tube along said optical axis so as to focus light admitted through said objective lens onto an input surface of said image intensifier tube.

23. The method of claim 22 further including the step of providing a collimator lens, associating said collimator lens in a fixed relative position with an image output surface of said image intensifier tube so as to project a collimated image therefrom, and moving said collimator lens with said image intensifier tube as the latter is moved to focus said night vision device.

24. The method of claim 23 further including the steps of projecting said collimated image from said collimator lens onto an angulated dichroic filter, and using said dichroic filter to reflect said collimated image to an eyepiece lens for viewing by a user of said night vision device.

25. The method of claim 24 additionally including the steps of providing a reticle projector projecting a reticle pattern upon said dichroic filter for superimposition upon said image and viewing by said user along with said image.

26. The method of claim 25 including the step of tilting said reticle projector in order to change the location of said reticle pattern relative to said dichroic filter and said image reflected therefrom.

27. The method of claim 26 additionally including the steps of tilting said reticle projector about a first axis to effect elevational change in the location of said reticle pattern relative to said dichroic filter and said image reflected therefrom, and tilting said reticle projector about a second axis to effect azimuth change in the location of said reticle pattern relative to said dichroic filter and said image reflected therefrom.

28. A method of focusing a night vision device, said method comprising steps of:

providing an image intensifier tube having an optical axis;
disposing a collimator lens along said optical axis to project a collimated image from said image intensifier tube; and
simultaneously moving both said image intensifier tube and said collimator lens along said optical axis so as to focus light onto an input surface of said image intensifier tube.

29. A method of adjusting the apparent position of a reticle pattern as said reticle pattern is superimposed upon an image of a scene viewed through a night vision device, said method comprising steps of:

providing said night vision device with an image intensifier tube;
using said image intensifier tube to provide an intensified image of a night scene;
using a collimator lens to project a collimated image from said image intensifier tube; and
simultaneously moving both said image intensifier tube and said collimator lens along said optical axis so as to focus light onto an input surface of said image intensifier tube.

* * * * *